United States Patent [19]

Kimura

[11] Patent Number: 4,648,656
[45] Date of Patent: Mar. 10, 1987

[54] CAR SEAT

[75] Inventor: Syuzaburo Kimura, Yokohama, Japan

[73] Assignee: Ikeda Bussan Co., Ltd., Ayase, Japan

[21] Appl. No.: 898,881

[22] Filed: Aug. 21, 1986

Related U.S. Application Data

[63] Continuation of Ser. No. 627,888, Jul. 5, 1984, abandoned.

[30] Foreign Application Priority Data

Jul. 13, 1983 [JP] Japan ............................ 58-108730[U]

[51] Int. Cl.⁴ .............................................. B60N 1/023
[52] U.S. Cl. .................................. 297/337; 188/82.2; 188/82.77; 248/429; 297/344
[58] Field of Search ............... 297/317, 322, 329, 337, 297/344, 346; 74/411.5; 192/8 R; 188/82.2, 82.4, 82.7, 82.77; 248/393, 424, 429

[56] References Cited

U.S. PATENT DOCUMENTS

| 534,883 | 2/1895 | Hoepner | 192/8 R |
|---|---|---|---|
| 2,161,366 | 6/1939 | McGreger | 297/344 |
| 2,235,239 | 3/1941 | Saunders | 297/344 X |
| 3,235,308 | 2/1966 | Conner | 297/337 |
| 4,094,489 | 6/1978 | Yoshimura | 297/344 X |
| 4,440,442 | 4/1984 | Drouillard et al. | 297/329 X |

FOREIGN PATENT DOCUMENTS

| 177841 | 11/1906 | Fed. Rep. of Germany | 188/82.2 |
|---|---|---|---|
| 467608 | 9/1927 | Fed. Rep. of Germany | 188/82.2 |
| 152629 | 11/1980 | Japan | 248/429 |
| 327448 | 4/1930 | United Kingdom | 297/317 |

Primary Examiner—Francis K. Zugel
Assistant Examiner—Peter R. Brown
Attorney, Agent, or Firm—Pearne, Gordon, McCoy & Granger

[57] ABSTRACT

The invention concerned relates to a car seat having one side frame each mounted on the upper rails of a pair of left and right seat slide adjusters for the entire seat and backrest, with a seat cushion frame installed so as to allow free sliding in either direction, and a rack contained either in one of these side frames or one of these seat cushion frames, while a shaft with a pinion which engages with said rack is installed in the other frame, together with a lock mechanism that selectively restricts the rotation of the aforementioned pinion. Due to the aforementioned peripheral mechanism consisting of a rack and pinion and the lock mechanism, this car seat allows the seat cushion to be slid and adjusted independently towards or away from the backrest of the seat easily and continuously and also enables the seat cushion to be locked securely in place at the desired position.

7 Claims, 5 Drawing Figures

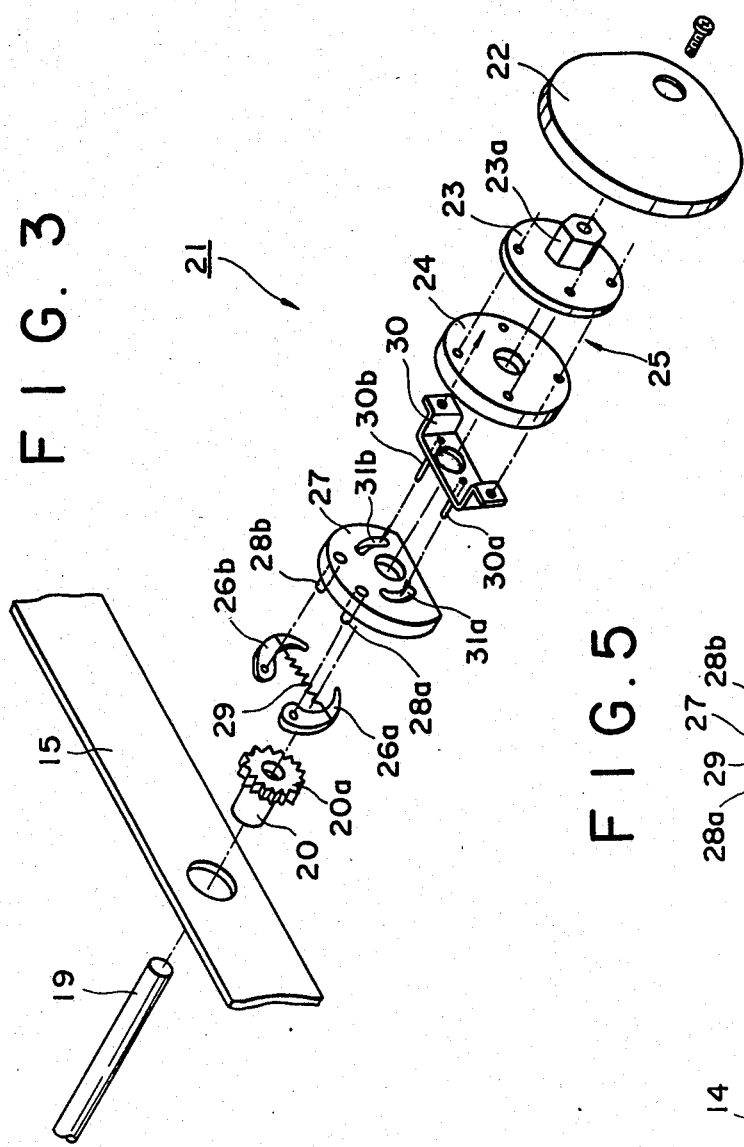
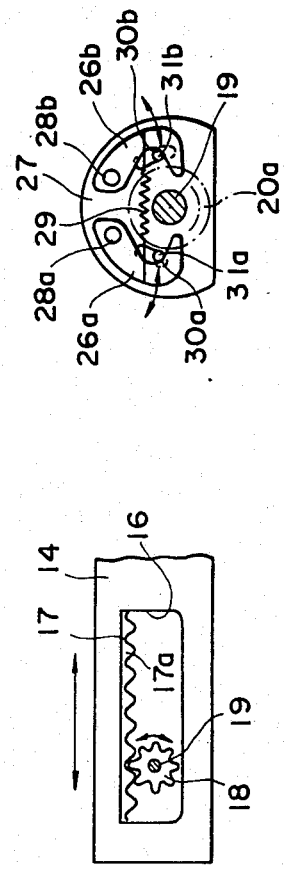

CAR SEAT

This is a continuation of application Ser. No. 627,888, filed on July 5, 1984, now abandoned.

BACKGROUND OF THE INVENTION

1. Field of the Invention

The invention concerned relates to a car seat, or more specifically to a car seat whose seat cushion is supported in such a manner that it is independent and can be moved and adjusted in two directions, both towards the front and the back of the seat.

2. Description of the Prior Art

Normally, a car seat 1 of this type consists of a seat cushion 2 and a seat back or backrest 3, as shown in FIG. 1. The seat frame (not shown in the illustration), which supports the whole seat described above, is itself supported by a forward/backward slide mechanism etc. on the floor of the vehicle's body, thus allowing movement and adjustment both toward the front and the back of the car body in order to enable adaptation according to the stature or preferences of the person seated. There is now a demand for a construction which, in addition to the above, allows the seat cushion 2 only to be moved and adjusted independently both towards the front and the back of the seat (shown by the imaginary lines in FIG. 1), making the seat 1 adjustable to the stature of the person seated for a greater freedom of adaptation. In other words, by being able to move only the seat cushion 2 towards the back of the seat, the feeling of pressure on the femoral region of the person seated is alleviated and operation of the pedals becomes easier. On the other hand, sliding the cushion 2 towards the front of the seat prevents the femoral region of the person seated from rising from the seat's surface, thus providing a more stable seating position.

Expectations concerning the design of a car seat with such a cushion 2 which can be moved and adjusted independently include the use of a sliding structure with a simple make-up which takes the connection with the mechanism for sliding the whole seat 1 forward and backward into consideration and which also poses no problems as far as space is concerned. In addition, movement of the sliding structure should be able to be performed smoothly and adequately, and it should be possible to stop the seat reliably at the required position. The construction should be reasonable, allowing adequate and reliable support of the seated person's weight, while the adjustment procedure itself should be simple and costs for manufacture low. However, previous proposals have shown complicated structures without enabling adequate continuous adjustment etc., at the same time posing problems as far as operability is concerned and generally having many disadvantages along with their merits, so that it has become desirable to devise effective countermeasures.

SUMMARY OF THE INVENTION

The invention concerned was made in view of the above circumstances. It proposes the installation of a pair of left and right side frames on both sides of the upper rail of the seat slide adjuster which supports the whole seat, supporting the seat cushion frame so as to enable free sliding. By also adding a peripheral mechanism consisting of racks and pinions as well as a lock mechanism which stops them at the required position, this simple construction allows the seat cushion to be moved towards or away from the backrest of the seat and adjusted easily, continuously and adequately as well as locking it reliably in the desired position. Besides, this kind of car seat could be produced cheaply.

BRIEF DESCRIPTION OF THE DRAWINGS

FIG. 3 is a simplified exploded view of an example of a lock mechanism, while

FIG. 4 and FIG. 5 are used to explain the operation of the various parts.

DETAILED DESCRIPTION OF PREFERRED EMBODIMENTS

Figure 1:
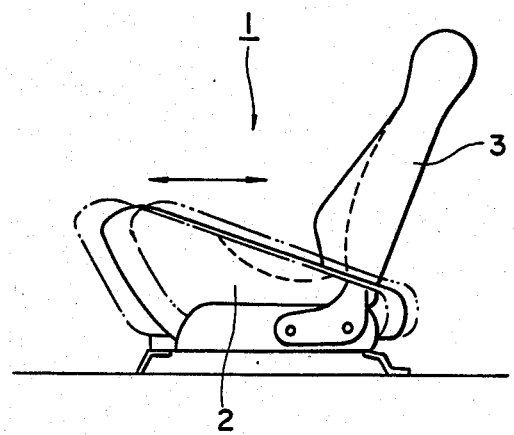
FIG. 1 is a lateral view showing a design outline of the car seat.
Figure 2:
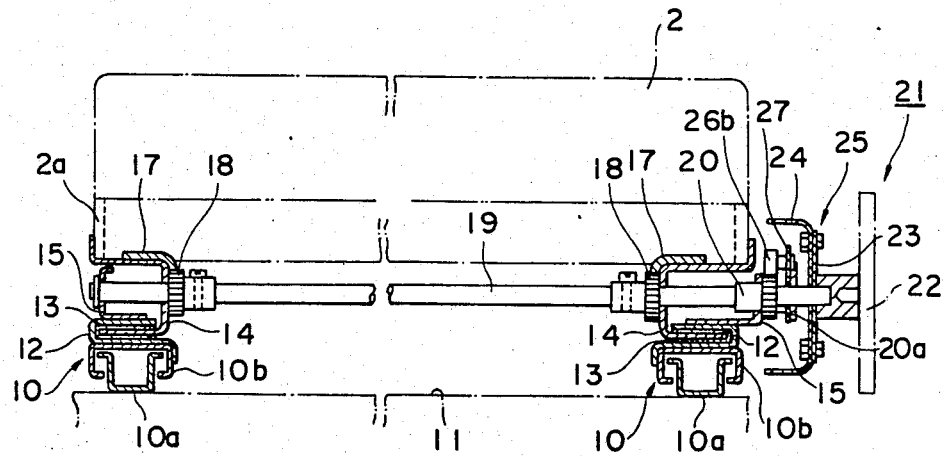
FIG. 2 is a partial cross-sectional view showing an application example of the invention concerned.

FIGS. 2 and 3 show actual examples of a car seat using the invention concerned. In these drawings, number 10 indicates the pair of seat slide adjusters installed on the floor surface 11 of the car body so as to correspond to both lower side parts of the seat's seat cushion 2. The lower rails 10a of these adjusters are fixed to the floor surface 11 of the car body, while the upper rails 10b are installed so as to allow them to slide freely towards the front or back of the seat along the lower rails 10a. These two seat slide adjusters 10 are both installed lengthwise along the longitudinal axis of the seat and are fixed by the aforementioned common lock mechanism at the desired position (not shown in the drawing). This construction allows the longitudinal position of the whole seat to be adjusted.

On the top of the aforementioned upper rails 10b, a pair of left and right supportive frames 12 with a substantially U-shaped profile are mounted with their open sides facing each other. Two frames 14, which are movable within the supportive frame 12 via slide elements 13 made of plastic material etc., are fitted into the supportive frames. These mobile frames 14 are fixed on the lower edge of the cushion frame 2a, so that the seat cushion 2 is supported in such a manner that it can be freely slid in forward and backward directions. The profiles of these mobile frames are bent into a substantially U-shape, and are installed so that their open sides face toward the outer sides of the seat. The aforementioned seat cushion 2 is installed on the top sides of the mobile frames 14 so as to ride on them.

On the upper sides of the supportive frames 12 on the aforementioned upper rail 10b, a pair of L-shaped left and right side frames 15 are mounted. These side frames 15 form a structure which allows the aforementioned mobile frames 14 to move forward and backward in the longitudinal direction of the seat along the side frames 15.

According to the invention concerned, these mobile frames 14 contain long grooves 16 (see FIG. 4) in the longitudinal direction of the seat. Racks 17 comprise cogs 17a which face downwardly near the upper edge of these long grooves 16 and are installed on the upper part of the mobile frames 14 as shown in FIG. 2. In addition, a shaft 19 provided with fixed pinions 18 corresponding to the racks 17, whose cogs engage with the cogs 17a of the racks 17 on the side of the mobile frames 14, is supported so as to rotate freely between the aforementioned side frames 15. One end of this shaft 19 is journaled in a boss 20 provided on gear 20a which is fixedly installed on one of the side frames 15 and extends toward the outer side of the seat. On the outward side of the shaft, a lock mechanism 21, which selectively restricts rotation of the aforementioned pinions 18, is installed.

The following is a more detailed explanation of the above using FIGS. 3 and 5. This lock mechanism 21 is supported on the aforementioned shaft 19. The lock mechanism includes an operating element 25 consisting of a knob 22 and two mounting plates 23, 24 as well as a lock release plate 27 fixedly installed on the aforementioned shaft 19 and a pair of latch catches 26a, 26b supported on the plate 27 in such a way that these catches can be pivoted thereon. The catches engage with the gear 20a provided on the side of the aforementioned side frame 15 from opposite sides. In other words, the latch catches 26a, 26b are inserted onto pins 28a, 28b which protrude from one side of this lock release plate 27 and serve as axes for the catches, while spring 29 pulls their free ends towards each other so that they engage in the gear 20a from opposite directions. These latch catches 26a, 26b serve to stop the rotation of the shaft 19 (that is to say of the pinions 18) in forward and reverse directions respectively.

On the mounting plate 24 of the aforementioned operating element, a bracket 30 provided with release pins 30a, 30b is mounted, which are used for the aforementioned latch catches 26a, 26b. These release pins 30a, 30b face the inside of the aforementioned latch catches 26a, 26b though the arc-shaped grooves 31a, 31b which are provided in the aforementioned lock release plate 27. Whenever this operating element 25 is rotated in either direction on the shaft 19 by operating the knob 22, either of the release pins 30a, 30b releases either of the latch catches 26a, 26b from the gear 20a, and subsequently engages the end wall of the groove 31a or 31b, to rotate the lock plate 27. The operating element thus functions to enable rotation of the shaft 19 (that is to say of the pinions 18) in either direction. The aforementioned mounting plates 23, 24 are fixed together with bolts. Besides, the knob 22 forms a single unit with these via the nut 23a installed on one of the mounting plates 23, making up the aforementioned operating element.

Due to this design, either of the latch catches 26a, 26b is released from the gear 20a when the knob 22 is turned in either direction, so that the shaft 19 (that is to say the pinions 18) can be rotated in either direction. The seat cushion 2 can thus be moved and adjusted in the required direction relative to the backrest 3. This should be clear from the fact that it is possible to move the cushion mobile frame 14, which is provided with the rack cogs 17a, either towards or away from the backrest 3 of the seat due to the rotation of the pinions 18.

When the user's hand is released from the knob 22 after adjusting the cushion to the required position, both latch catches 26a, 26b engage with the gear 20 from both directions due to the action of the spring 29, thus restricting rotation of the shaft 19 (that is to say, of the pinions 18). The rack cogs 17a, which are engaged with these pinions and regulate the movement of the seat cushion 2, therefore lock the seat cushion 2.

The above explains just one example for a practical application of the invention concerned. It should be clear that appropriate modifications and changes of various parts and structures are possible without altering the original intent of the invention. For example, it would be possible to install the pinions 18 and the racks 17 on the opposite sides of the frame, and various modifications of the construction of the lock mechanism 21 are conceivable.

As explained above, a pair of left and right side frames are installed on the upper rails of the seat slide adjuster which supports the whole seat, supporting the seat cushion with a mobile frame so as to enable free sliding. Since a peripheral mechanism consisting of racks and pinions as well as a lock mechanism which restricts them is added, the seat cushion only can be independently moved towards the front or back of the seat and adjusted easily and practically continuously despite the simple construction. In addition, it is possible to increase the amount of regulation by simply modifying the length of the rack cogs in order to provide even greater freedom of adjustment, thus not only allowing improvement of the functionality of the seat but also achieving various advantages for practical use such as superior ease of operation and reliability as well as cost savings.

What is claimed is:

1. An adjusting mechanism for a car seat having a seat cushion supported in such a manner as to allow its independent movement and adjustment towards and away from the backrest of the seat, said car seat adjustng mechanism comprising, in combination:
    a pair of left and right supports installed, one each, on the upper rails of a pair of left and right seat slide adjusters which support the entire seat with the backrest in such a way that the entire seat can be moved forward and backward;
    a pair of left and right side frames mounted on said pair of left and right supports;
    a pair of mobile frames supported by said side frames so as to allow said mobile frames to slide freely forward and backward;
    the seat cushion being installed on said mobile frames independently of the backrest;
    a rack contained in one of said pair of frames;
    a shaft with a pinion whose cogs engage with said rack being rotationally mounted in the other of said pair of frames, said pinion being arranged to move one pair of frames relative to the other pair of frames for adjustment of the seat cushion when said shaft is rotated;
    a lock mechanism including a knob on one end of said shaft and rotatable about the axis of said shaft;
    the lock mechanism being actuated by rotational movement of said knob to selectively restrict the rotation of said pinion and the location of the seat cushion;
    the lock mechanism including means to release said lock mechanism during initial rotation of the knob and thereafter upon continued rotation of the knob, to rotate said shaft and adjust the relative position of said pairs of frames and consequently said seat cushion.

2. A car seat adjusting mechanism according to claim 1, wherein each of said pair of supports has a substantially U-shaped profile and is mounted on said pair of upper rails with the open sides of the U-shape facing each other.

3. A car seat adjusting mechanism according to claim 2, wherein the lower sides of said pair of mobile frames with substantially U-shaped profiles are each fitted into the open sides of the substantially U-shaped profiles of said pair of supports.

4. A car seat adjusting mechanism according to claim 3, wherein slide elements are inserted into each of the sections where said supports and said mobile frames fit into each other.

5. A car seat adjusting mechanism according to claim 1, wherein each of said pair of side frames has an L-shaped profile.

6. A car seat adjusting mechanism according to claim 1, wherein a rack is contained in both of said mobile frames, wherein said shaft has two pinions which engage with the cogs of said racks and with the shaft installed through said pair of side frames.

7. A car seat adjusting mechanism according to claim 1, wherein said lock mechanism includes an operating element pivotably installed on said shaft,
- a boss with a gear on the outer side and a shaft insertion hole on the inner side fixedly installed on one of said side frames, the shaft being journalled in said hole;
- a pair of latch catches, carried on pivots fixed relative to said shaft, which pivot in response to pivoting of said operating element and which are urged by a spring to engage opposite sides of said gear;
- said knob being connected to pivot said operating element relative to said shaft; and
- a bracket installed on said operating element possessing a pair of release pins which each release the engagement of a selected one of the latch catches from the gear whenever the knob is rotated in a selected direction.

* * * * *

UNITED STATES PATENT AND TRADEMARK OFFICE
CERTIFICATE OF CORRECTION

PATENT NO. : 4,648,656

DATED : March 10, 1987

INVENTOR(S) : Syuzaburo Kimura

It is certified that error appears in the above-identified patent and that said Letters Patent is hereby corrected as shown below:

Column 4, line 8, delete "the front or back"
and insert --or away from the backrest 3--

Claim 1, column 4, line 22, "adjustng"
should be --adjusting--

Signed and Sealed this

Eighth Day of December, 1987

Attest:

DONALD J. QUIGG

Attesting Officer

Commissioner of Patents and Trademarks